United States Patent
Roborel De Climens et al.

(10) Patent No.: US 10,023,291 B2
(45) Date of Patent: Jul. 17, 2018

(54) AIRCRAFT FLOOR INCORPORATING A GROUND PLANE

(71) Applicant: BOMBARDIER INC., Dorval (CA)

(72) Inventors: Lody Roborel De Climens, Montréal (CA); Philippe Desy, Prévost (CA); Jean-Guy Gaudreau, St-Bernadin (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/874,252

(22) Filed: Jan. 18, 2018

(65) Prior Publication Data

US 2018/0141634 A1    May 24, 2018

Related U.S. Application Data

(62) Division of application No. 14/772,429, filed as application No. PCT/IB2014/000209 on Feb. 26, 2014.

(60) Provisional application No. 61/773,441, filed on Mar. 6, 2013.

(51) Int. Cl.
  *B64C 1/18*  (2006.01)
  *F16M 13/02*  (2006.01)
  *B64D 45/02*  (2006.01)

(52) U.S. Cl.
  CPC ............... *B64C 1/18* (2013.01); *B64D 45/02* (2013.01); *F16M 13/02* (2013.01)

(58) Field of Classification Search
  CPC .................................. B64C 1/18; B64D 45/02
  See application file for complete search history.

(56) References Cited

U.S. PATENT DOCUMENTS

| | | | |
|---|---|---|---|
| 4,399,642 A * | 8/1983 | Bard et al. ...................... | 52/483 |
| 5,083,727 A * | 1/1992 | Pompei et al. ............ | 244/118.6 |
| 6,469,244 B1 | 10/2002 | Harrison et al. | |
| 7,182,291 B2 * | 2/2007 | Westre et al. ................. | 244/119 |
| 2007/0289776 A1 | 12/2007 | Liang et al. | |
| 2008/0098682 A1 | 5/2008 | Wood | |
| 2010/0276536 A1 | 11/2010 | Lambert et al. | |
| 2010/0304069 A1 | 12/2010 | Oguri et al. | |
| 2012/0205134 A1 | 8/2012 | Brasier et al. | |

FOREIGN PATENT DOCUMENTS

| | | |
|---|---|---|
| CN | 101610948 B | 5/2013 |
| CN | 101636316 B | 12/2013 |
| CN | 101896402 B | 4/2014 |

(Continued)

OTHER PUBLICATIONS

PCT International Search Report and Written Opinion dated Sep. 15, 2014 re: International Patent Application No. PCT/IB2014/000209.

(Continued)

*Primary Examiner* — Hung V Ngo

(74) *Attorney, Agent, or Firm* — Norton Rose Fulbright Canada LLP

(57) ABSTRACT

A system for shielding of at least one component within an aircraft includes a floor panel disposed at least partially between joists supporting a floor within the aircraft and a ground plane connected to a bottom surface of the floor panel. The ground plane extends at least partially between adjacent joists. At least one bracket electrically connects the ground plane to at least one of the joists.

6 Claims, 7 Drawing Sheets

(56) References Cited

FOREIGN PATENT DOCUMENTS

DE    102007062111  A1    7/2009
WO        0117850  A1    3/2001

OTHER PUBLICATIONS

English translation of German Patent No. DE 10 2007 062 111 dated Jul. 2, 2009, machine-generated translation by Patent Translate Powered by EPO and Google, May 16, 2017.
English translation of Chinese patent document No. CN 101636316 dated Dec. 25, 2013; www.google.ca/patents . . . .
English translation of Chinese patent document No. CN 101896402 dated Apr. 30, 2014; www.google.ca/patents . . . .
English translation of Chinese patent document No. CN 101610948 dated May 15, 2013; www.google.ca/patents . . . .
The State Intellectual Property Office of the People's Republic of China; Notification of First Office Action dated Aug. 2, 2016 re. Applicaiton No. 201480011794.X.
The State Intellectual Property Office of the People's Republic of China; Notification of Second Office Action dated Apr. 1, 2017 re: Application No. 201480011794.X.
United States Patent and Trademark Office, Office Action dated Jun. 2, 2017 re: U.S. Appl. No. 14/772,429.
Norton Rose Fulbright Canada LLP, Response to Office Action dated Jun. 2, 2017 re: U.S. Appl. No. 14/772,429.
United States Patent and Trademark Office, Office Action dated Sep. 6, 2017 re: U.S. Appl. No. 14/772,429.
Norton Rose Fulbright Canada LLP, Response to Office Action dated Sep. 6, 2017 re: U.S. Appl. No. 14/772,429.

\* cited by examiner

AIRCRAFT FLOOR INCORPORATING A GROUND PLANE

CROSS REFERENCE TO RELATED APPLICATIONS AND CLAIM OF PRIORITY

This application is a Divisional of U.S. patent application Ser. No. 14/772,429 filed on Feb. 26, 2014, which is a national phase application under 35 U.S.C. 371 of International Patent Application No. PCT/IB2014/000209 filed on Feb. 26, 2014, which claims priority to U.S. provisional patent application No. 61/773,441 filed on Mar. 6, 2013, the entire contents of which are hereby incorporated by reference.

FIELD OF THE INVENTION

The present invention concerns a construction incorporating a protective ground plane into a floor panel of an aircraft, a bracket for connecting the ground plane to a joist supporting a floor panel in an aircraft, and a system combining the ground plane and bracket for grounding the ground plane within an aircraft. The ground plane is contemplated to provide isolation from electromagnetic and radio frequency sources, among other types of electrical protection.

DESCRIPTION OF THE RELATED ART

In the construction of traditional aircraft, it has been the practice of aircraft manufacturers to place wire bundles at strategic locations within the fuselage of the aircraft. The wire bundles include wires that provide power to various devices located on the aircraft. The wires also carry electrical signals between devices located on the aircraft and, therefore, provide electronic communication between those various devices.

As should be apparent to those skilled in the art, it is known to provide electrical shielding for the wire bundles within the aircraft. Electrical protection (or shielding) encompasses insulating (or isolating) wires from interference from one or more sources of electromagnetic and/or radio frequency sources.

With respect to electromagnetic and radio frequency transmissions, it should be apparent that there are various sources of potentially interfering signals. Interference may be generated by components that are part of the aircraft. Separately, passengers and crew members may bring devices on board the aircraft (i.e., cellular telephones, tablets, computers, etc.) that may generate electromagnetic ("EM") and/or radio frequency ("RF") signals that have the potential to interfere with signals transmitted along the wire bundles. A third potential source of EM and RF signals are those generated exterior to the aircraft. For example, communications towers (i.e., cellular towers, radio towers, etc.) may generate signals that are of sufficient strength to interfere with aircraft systems, even from an appreciable distance.

A simple way to provide electrical protection for one or more wires is to position the wires near to a grounded, electrically conductive substrate. Typically, the substrate is made from metal, because metal materials are excellent conductors. In addition, metal materials function well to protect electrical signals in wires from being influenced by EM and RF interference.

As should be apparent to those skilled in the art, the skin of traditional aircraft is made from aluminum or an alloy of aluminum. Being made from metal, the skin of the traditional aircraft offers a convenient surface against which wire bundles may be positioned. As a result, it has been common practice to lay wire bundles adjacent to (or in close proximity) to the interior surface of the skin of the aircraft. By positioning the wire bundles adjacent to the skin of the aircraft, the traditional aircraft designer has been able to provide EM and RF shielding for those wires.

More and more, modern aircraft incorporate non-metallic components. For example, modern aircraft incorporate carbon fiber composite materials into at least some of the panels forming the skin and other structural components.

Carbon fiber composite materials are not particularly conductive when compared to metals. As a general rule, carbon fiber materials are about one thousand times (1000×) less conductive than metals. Carbon fiber materials, therefore, are inadequate for shielding wires from EM and RF interference.

As should be apparent, with the substitution of carbon fiber composite materials for metal in modern aircraft, the skin of the aircraft may no longer act as a suitable ground location, to establish an EM shield and/or RF shield for the wire bundles positioned adjacent thereto.

Separately, given the space requirements in aircraft, it is contemplated that the wire bundles may not be placed adjacent to the skin of the aircraft, even where the aircraft is made entirely from metal.

As a result, a need has developed for a light-weight EM/RF shield for electrical wire bundles disposed within the aircraft, regardless of the positioning of the wire bundles in the aircraft. In other words, a need developed a way to shield electrical wires regardless of their position within the aircraft.

SUMMARY OF THE INVENTION

The present invention addresses one or more of the deficiencies noted with respect to the prior art.

In one contemplated embodiment, the present invention provides a system for shielding of at least one component within an aircraft. The system includes a floor panel disposed at least partially between joists supporting a floor within the aircraft, a ground plane connected to a bottom surface of the floor panel, the ground plane extending at least partially between adjacent joists, and at least one bracket electrically connecting the ground plane to at least one of the joists.

In another embodiment of the system of the present invention, the ground plane shields the at least one component from at least one of electromagnetic and radio frequency interference.

It is contemplated that the ground plane is made of a plate of electrically conductive material and at least one hole provided in the plate to lighten the total weight of the plate. The hole is sized for shielding of the at least one component, accommodating at least one of frequency and wavelength of impingent radiation upon the at least one component.

It is calculated that the hole is no more than about $\frac{1}{10}^{th}$ of the size of a minimum wavelength of the impingent radiation.

The bracket that forms a part of the invention includes a body defining a first end and a second end. The first end connects to a ground plane and the second end connects to the joist. At least one first fastener connects the first end to the ground plane. At least one second fastener connects the second end to the joist. A spacer connects to the first end, establishing a contact surface between the spacer and the ground plane. A seal surrounds the spacer.

Another embodiment of the present invention provides a ground plane for shielding of at least one component within an aircraft. The ground plane includes a plate of electrically conductive material, and at least one hole provided in the plate to lighten the total weight of the plate. The hole is sized for shielding of the at least one component, accommodating at least one of frequency and wavelength of impingent radiation upon the at least one component. As noted, the hole may be no more than about $1/10^{th}$ of the size of a wavelength of the impingent radiation. In one embodiment, the hole is about 1.2 inches in diameter.

It is contemplated that the ground plane shields the at least one component from at least one of electromagnetic and radio frequency interference.

The component may be a wire bundle disposed adjacent to the ground plane.

The ground plane is contemplated to be made from metal.

The present invention also provides a bracket for connecting a ground plane to a joist for shielding of at least one component within an aircraft. The bracket includes a body defining a first end and a second end, wherein the first end connects to a ground plane and wherein the second end connects to the joist, at least one first fastener connecting the first end to the ground plane, at least one second fastener connecting the second end to the joist, a spacer connected to the first end, establishing a contact surface between the spacer and the ground plane, and a seal surrounding the spacer.

The spacer is contemplated to be made from an electrically conductive material.

The bracket is contemplated to be made from metal.

The spacer is contemplated to include a peripheral portion and an inner portion with a thickness greater than that of the peripheral portion.

The seal surrounding the spacer is contemplated to be made from an elastomeric material.

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of any particular embodiment is not intended to be limiting of the present invention. To the contrary, the discussion of selected embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of an aircraft 10, such as the one illustrated in the perspective view provided in FIG. 1.

Figure 1:
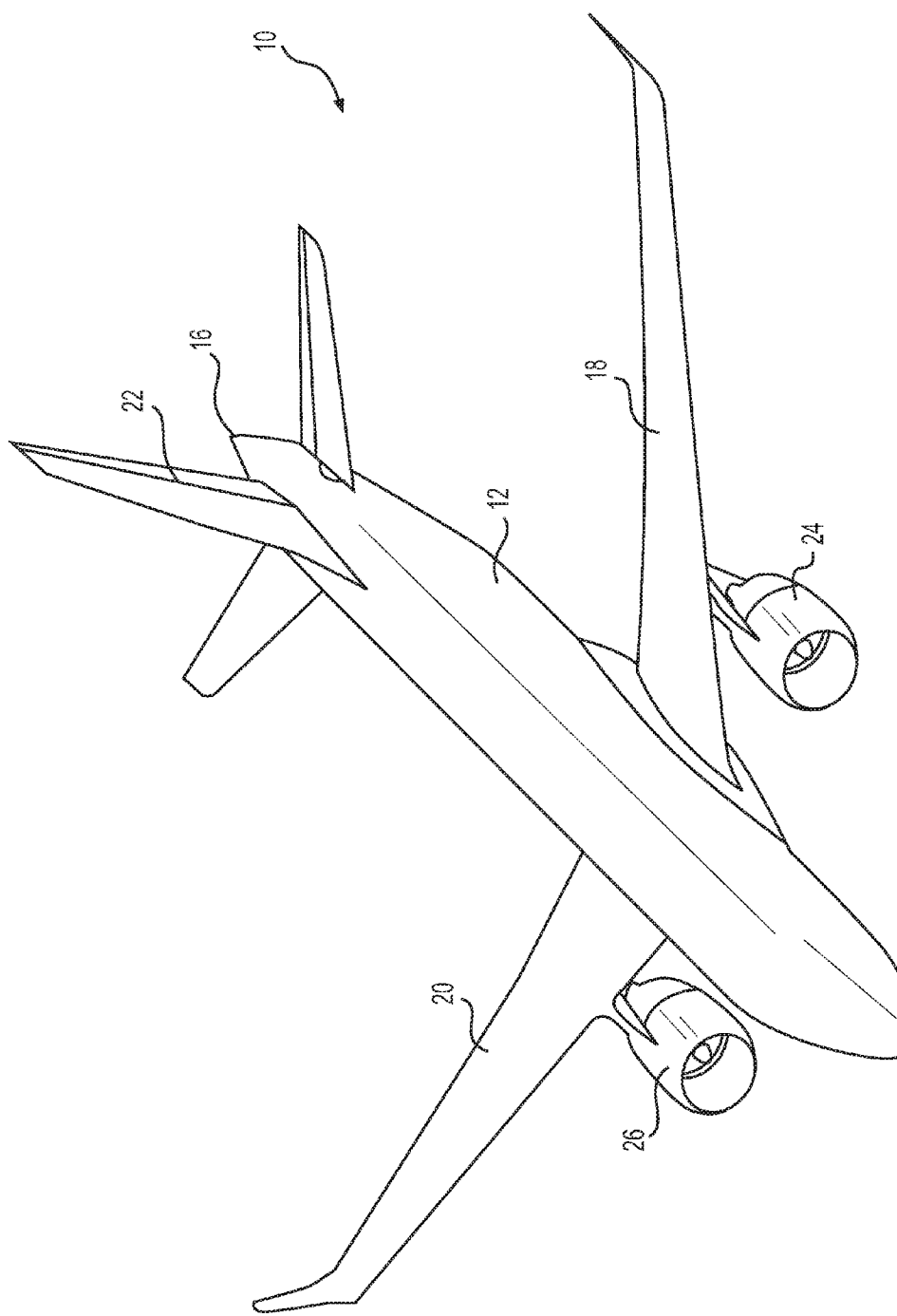
FIG. 1 is a perspective illustration of an aircraft that incorporates the features of the present invention.

FIG. 1 is a perspective illustration of an aircraft 10 to which the present invention applies. The aircraft 10 includes a fuselage 12 defining a forward end 14 and a rear (or aft) end 16. Two wings 18, 20 extend laterally from the fuselage 12. A tail section 22 is attached to the rear end 16 of the aircraft. As should be apparent to those skilled in the art, the wings 18, 20 and the tail section 22 incorporate multiple control surfaces that are responsible for flying characteristics and flight operations of the aircraft 10. Two engines 24, 26 are suspended from and connect to the wings 18, 20, as illustrated.

As discussed above, all aircraft 10 include wire bundles 28 that perform at least two primary functions. Some of the wires in the wire bundles transfer power to one or more of the operational components within the aircraft 10. Others of the wires transmit electrical signals that are processed by one or more of the devices on the aircraft 10. As a result, it is desirable to provide shielding so that the wires in the wire bundles 28 are insulated (or isolated) from EM and RF influences. As should be apparent to those skilled in the art, EM and RF influences (among other variables) may impact upon the performance and/or operation of the wires in the wire bundles 28 in addition to interfering with one or more components on board the aircraft.

Figure 2:
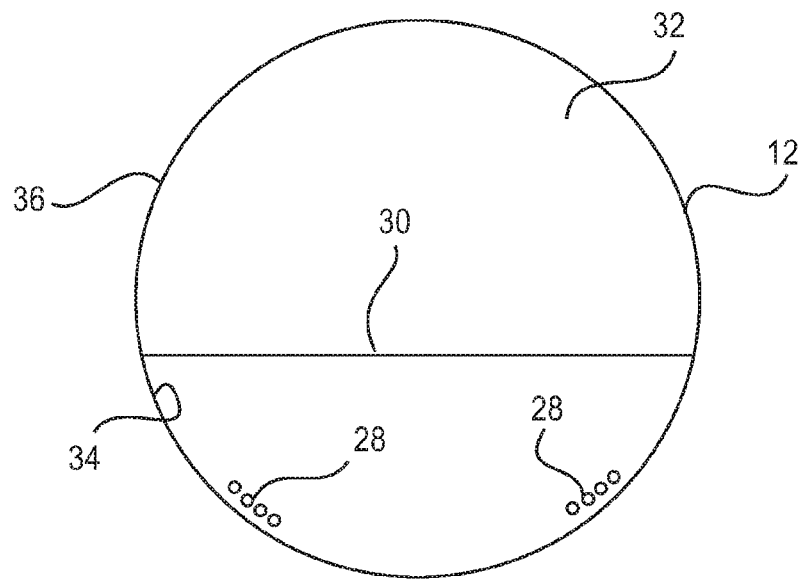
FIG. 2 is a graphical cross-section of an aircraft fuselage, illustrating a conventional location for the placement of wire bundles within the aircraft fuselage.

FIG. 2 is a graphical cross-section of a conventional aircraft 10. A floor 30 of the cabin 32 is provided for reference. As illustrated, wire bundles 28 are positioned adjacent to the interior surface 34 of the fuselage 12. The wire bundles 28 extend along the length of the aircraft 10 from a position near to the front end 14 to a position near to the rear end 16. As noted above, in the conventional aircraft 10, the skin 36 of the aircraft 10 is made from a metal, in particular aluminum or an aluminum alloy. The metal skin 36, therefore, provides a convenient location for the placement of the wire bundles 28 thereagainst. The skin 36 of the aircraft 10 provides shielding from EM and RF sources.

As also discussed above, modern aircraft are, more and more, incorporating carbon fiber composite panels in lieu of aluminum parts. Carbon fiber panels, while lighter and (in some configurations) stronger than their aluminum counterparts, are not particularly conductive. As a general rule, carbon fiber composite components are about 1000 times less conductive than metals. As a result, carbon fiber components do not adequately shield the wire bundles 28 from EM and/or RF sources.

Figure 3:
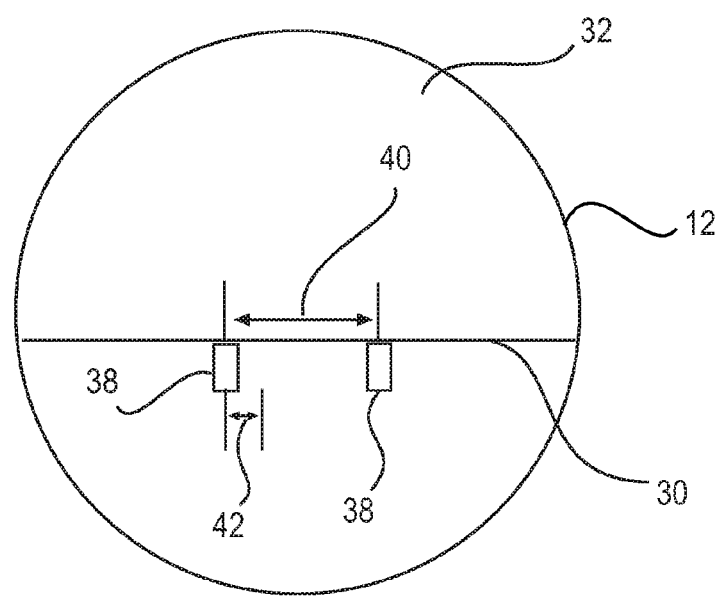
FIG. 3 is a graphical cross-section of the aircraft fuselage of the present invention, illustrating at least one challenge associated with the placement of wire bundles within the interior of the aircraft.

FIG. 3 is a graphical cross-section of the aircraft illustrated in FIG. 1. This cross section is provided to assist with a discussion of specific aspects of the present invention.

As should be apparent to those skilled in the art, the floor 30 is supported by joists 38, which are spaced from one another and extend along the longitudinal axis of the aircraft 10. Cross joists (not shown in this illustration) extend laterally between the sides of the fuselage 12 and connect the joists 38 together to form a checkerboard lattice under the floor 30 within the cabin 32 of the aircraft 10.

As should be apparent to those skilled in the art, the joists 38 typically are made from metal, such as aluminum or an aluminum alloy. Being made from metal, the joists 38 provide at least a limited degree of grounding and protection against EM and RF interference. However, the distance 40 between the joists 38 exceeds the protective distance 42 established by the joists 38. As such, any wire bundles 28 that are positioned adjacent to the joists 38 will not benefit from protection from EM and RF interference because some portion of the wire bundles 28 will lie outside of the protective distance 42 established by the joists 38.

Figure 4:
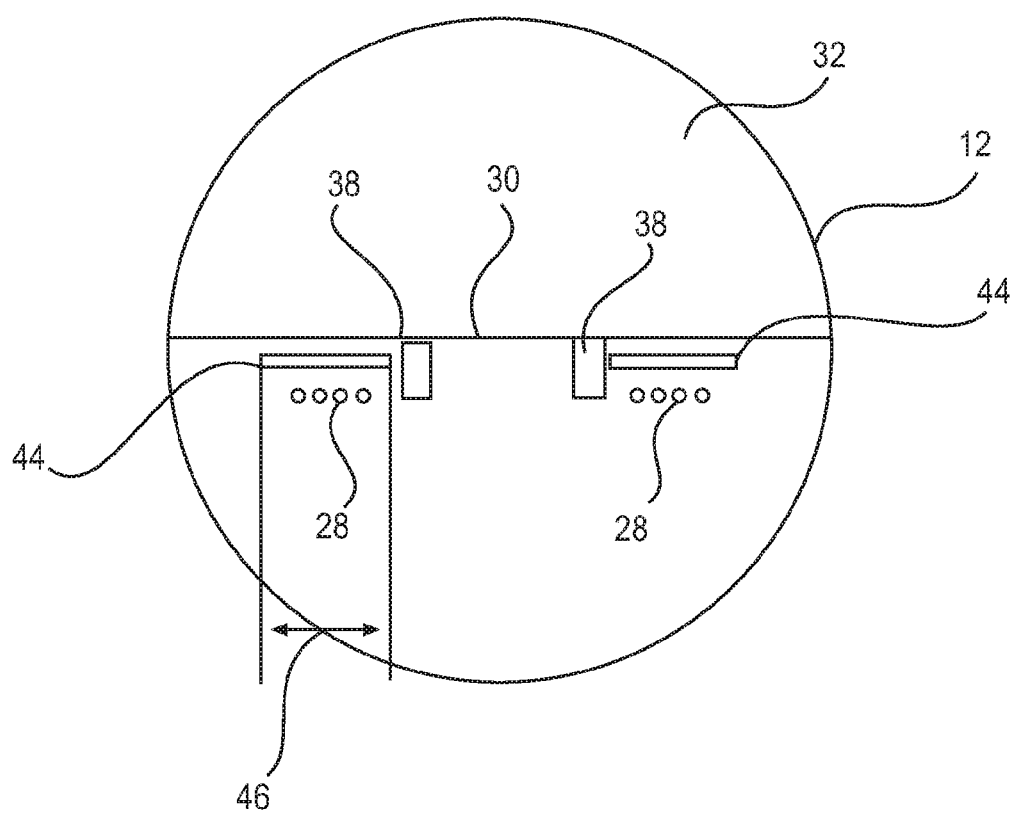
FIG. 4 is a graphical cross-section of the aircraft fuselage of the present invention, showing at least one contemplated placement of ground plane(s) beneath the floor of the aircraft's cabin.

FIG. 4 illustrates one aspect of the present invention. Specifically, to provide protection from EM and RF interference (hereinafter referred to as "electrical protection"), the aircraft 10 of the present invention incorporates ground planes 44 that are positioned beneath the floor 30, above and adjacent to respective ones of the wire bundles 28.

The ground planes 44 are contemplated to be made from a conductive material, such as metal. In the illustrated embodiment, the ground planes are made from aluminum or an aluminum alloy. The ground planes have a width 46 that is at least as wide as the adjacent wire bundle 28. The wire bundles 28 are positioned sufficiently close to the ground planes 44 so that they benefit from the electrical protection established by the ground planes 44.

In the contemplated embodiment, the ground planes 44 have a width 46 that is greater than the widths of the wire bundles 28 disposed adjacent thereto. In an alternative embodiment, the ground planes 44 may have widths that are equal to the widths of the wire bundles 28. In a third contemplated embodiment, the ground planes 44 may have widths 46 that are less than the widths of the bundles 28 positioned adjacent thereto. In this third embodiment, it is understood that the ground planes 44 establish electrical protection that extends a distance from the edges thereof, just as the joists 38 establish a protective distance 42 therefrom. Relying on this aspect of the ground planes 44, it is contemplated that the ground planes 44 need not be as wide as the adjacent wire bundles 28.

As also is illustrated in FIG. 4, the ground planes 44 are contemplated to be interposed between the floor 30 (which is made from a matrix of floor panels 30 that are connected to the joists 38 and the cross joists (not shown in this view)) and the wire bundles 28. In an alternative embodiment, it is contemplated that the ground planes 44 may be positioned within the aircraft 10 such that the wire bundles 28 are positioned between the ground planes 40 and the floor 30 without departing from the scope of the present invention.

It is noted that the floor panels 30 provide a convenient location for the location of the ground plane 44 of the present invention. In addition, the floor panels 30 are removable from the joists and cross-joists 48, thereby providing access to any wire bundles 28 positioned thereunder.

Figure 5:
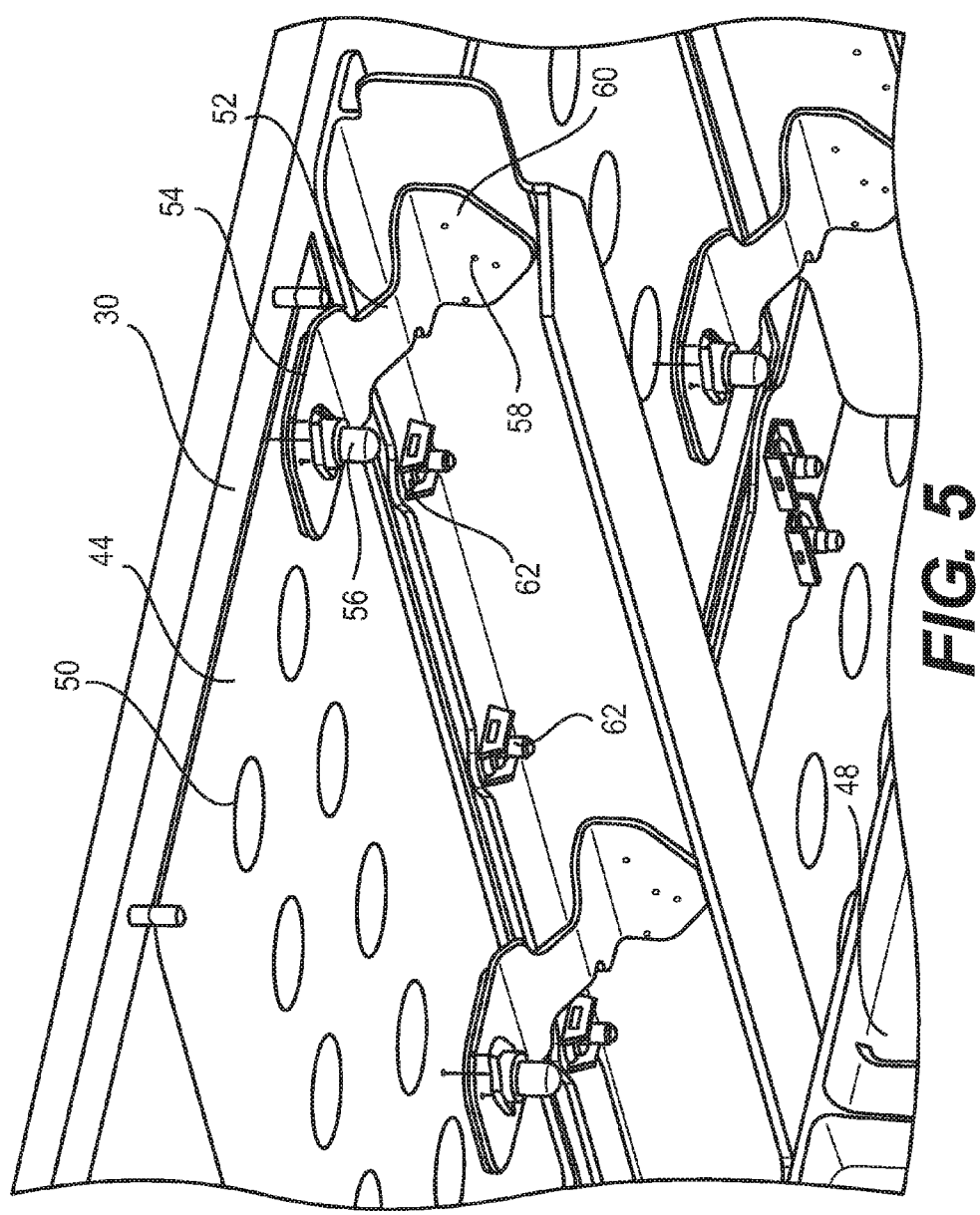
FIG. 5 is a perspective illustration of one embodiment of the ground plane and bracket(s) of the present invention.

FIG. 5 is a perspective view showing one contemplated embodiment of the present invention. The perspective is taken from a vantage point beneath the floor 30 of the aircraft 10 looking upwardly at the bottom surface of one or more of the floor panels 30. The joists 38 are visible in this illustration, as is at least one of the cross joists 48. The ground plane 44 is visible beneath the floor 30.

As should be apparent to those skilled in the art, the weight of components in the aircraft 10 is always a concern for aircraft designers. Specifically, aircraft designers endeavor to lighten aircraft components so that they present a minimal weight addition to the aircraft 10 while performing their intended function(s). This design consideration applies to the ground plane 44, just as it does with other aircraft components.

So that the ground plane 44 offers sufficient electrical protection but does not add unnecessarily to the overall weight of the aircraft 10, the ground plane 44 is constructed to be thin and to include a plurality of holes 50 cut therethrough. With respect to the thickness of the ground plane 44, one embodiment contemplates that the ground plane 44 will be quite thin. For example, the ground plane 44 may be only ten one thousandths of an inch (0.01 inch; 0.254 mm) thick. It is contemplated that the ground plane 44 may be made thicker or thinner without departing from the scope of the present invention.

Being so thin, the ground plane 44 is more like an aluminum foil, rather than a rigid plate of metal. Being so thin, the ground plane 44 preferably is affixed to the bottom surface of the floor 30 so that the ground plane 44 is not easily torn or damaged. It is contemplated that the ground plane 44 may be applied to the floor 30 as a coating during manufacture of the floor 30. Alternatively, the ground plane 44 may be affixed to the bottom of the floor 30 via any suitable adhesive or other suitable attachment means.

As noted above, the ground plane 44 includes a plurality of holes 50 cut therethrough. The holes 50 have a diameter that does not exceed a maximum size required for electrical protection.

One embodiment of the present invention contemplates that the holes 50 will have diameters of about 1.2 inches (3.05 cm). It is also contemplated that the distance between holes 50 will not be less than 1.2 inches (3.05 cm). This specific distance was selected based on calculations associated with the frequency and wavelength of the types of electrical threats anticipated to be present in the aircraft 10 (i.e., electronic devices) or in the environment through which the aircraft 10 travels (i.e., communications towers).

It is noted that the holes are sized to accommodate specific wavelength (and frequencies) of EM and RF interference. The holes 50 have a diameter that is approximately 1/10 of the length of the shortest wavelength of the types of interfering EM and/or RF radiation that is anticipated to impinge thereon. Finally, while circular holes are illustrated, the holes 50 may have any shape without departing from the scope of the present invention.

As should be apparent, the ground plane 44 of the present invention is not considered to be limited to this particular construction. Holes 50 with a larger or smaller diameter may be employed without departing from the scope of the present invention. Moreover, the distance between the holes may be larger or smaller than 1.2 inches (3.05 cm) without departing from the scope of the present invention.

In one contemplated embodiment, the ground plane 44 does not include any holes 50. While this adds weight to the aircraft 10, a solid ground plane 44 offers maximum shielding protection to any wire bundles 28 positioned adjacent thereto.

So that the ground plane 44 is electrically grounded within the aircraft 10, the ground plane 44 is connected to the joists 38 (or, alternatively, the cross joists 48) via one or more brackets 52. The brackets 52 are connected to the ground plane 44 and the floor 30 at a first end 54, via one or more fasteners 56. The brackets 52 are connected to the joists 38 at a second end 58 via one or more fasteners 60.

At the first end 54, the bracket 52 and the ground plane 44 establish a metal-to-metal contact to ensure a reliable electrical connection therebetween. Similarly, at the second end 58, the bracket 52 and the joist 38 present a metal-to-metal contact to ensure a reliable, electrical contact therebetween. As such, the ground plane 44 is suitably grounded via the network of supports made up of the joists 38 and the cross joists 48 (among other components in the aircraft 10).

In FIG. 5, floor fasteners 62 also are illustrated. The floor fasteners 62 removably connect the floor panels 30 to the joists 38 and the cross joists 48. As should be apparent to those skilled in the art, the floor panels 30 are designed to be removable so that personnel may access the components (including the wire bundles 28) that are located beneath the floor 30. Such access may be needed, for example, to perform maintenance or repairs on the aircraft 10.

So that the floor panels 30 may be disengaged from the brackets 52, the fasteners 56 also are removable. The second ends 58 of the brackets 52 are not contemplated to be removed easily from the joists 38 (or cross-joists 48) unless there is a need to replace one or more of the brackets 52. In other words, the brackets 52 in this embodiment are contemplated to remain affixed to the joists 38 after removal of one or more of the floor panels 30.

Figure 6:
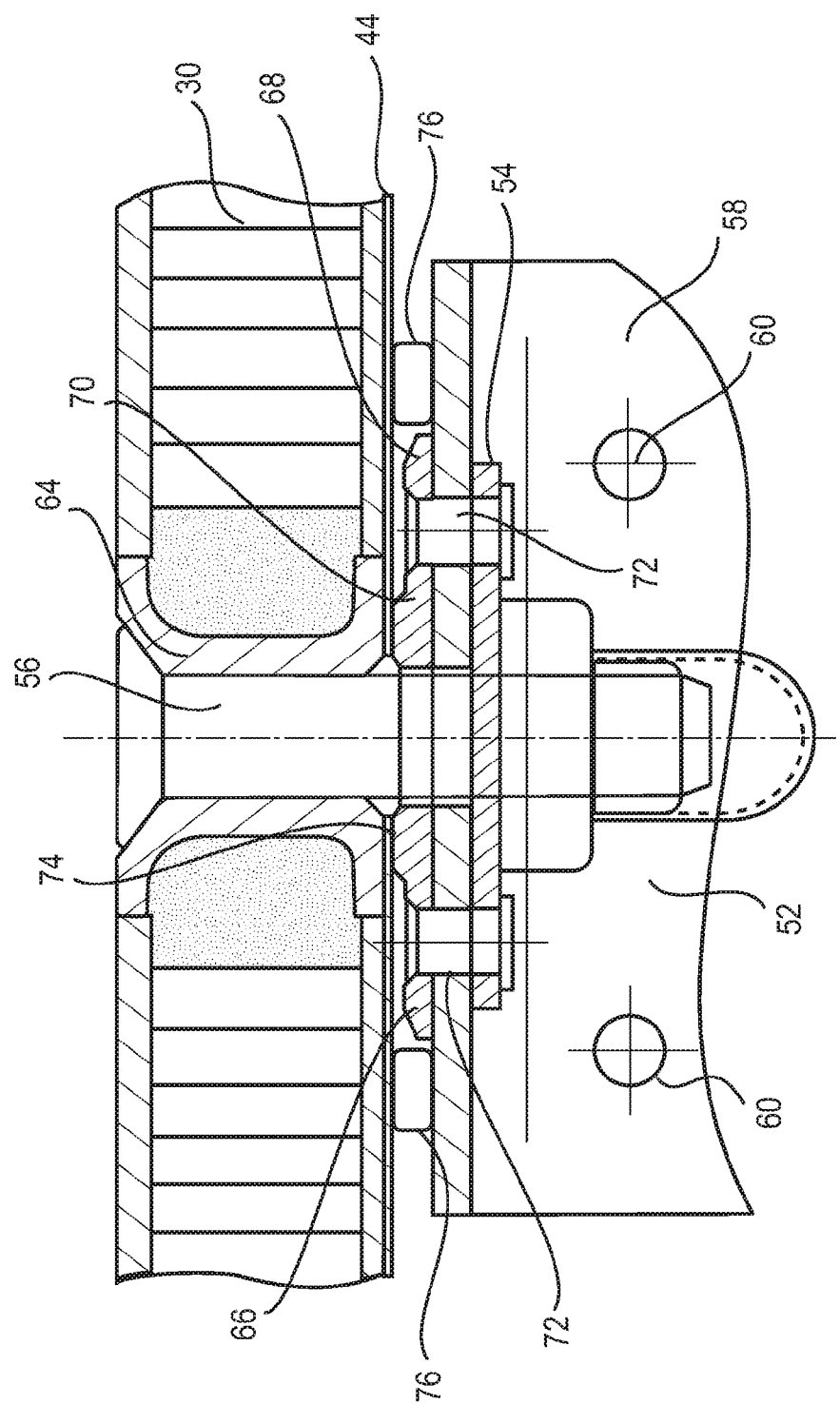
FIG. 6 is an enlarged, cross-sectional view of embodiment of the ground plane and brackets illustrated in FIG. 5.

FIG. 6 is a cross-sectional view of a portion of the ground plane 44 of the present invention, the cross section being taken through one of the fasteners 56. The perspective is looking toward one of the joists 38 from the fastener 56.

The fastener 56 extends through the floor panel 30 and the first end 54 of the bracket 52. The fastener 56 is surrounded by a first seal 64 that extends through the floor panel 30. The first seal 64 helps to protect the electrical connection between the ground plane 44 and the bracket 52.

The first end 54 of the bracket 52 includes a spacer 66 that is connected to and extends upwardly from a top surface of the bracket 52. The spacer 66 includes a thin, peripheral portion 68 and a thicker, inner portion 70.

The peripheral portion 68 of the spacer 66 is penetrated by at least one fastener 72 that connects the spacer 66 to the first end 54 of the bracket 52. As should be apparent, the illustrated embodiment provides room for two fasteners 72. While two fasteners 72 are illustrated, a larger or a fewer number may be used without departing from the scope of the present invention.

The spacer 66 is electrically connected to the first end 54 of the bracket via a metal-to-metal contact. As should be apparent, the spacer 66 is made from metal, such as aluminum. However, the spacer 66 may be made from any other suitable, conductive material without departing from the scope of the present invention. The inner portion 70 of the spacer 66 establishes an electrical contact 74 between the bracket 52 and the ground plane 44. A second seal 76, made from an elastomeric material such as rubber, surrounds the spacer 66. In addition to the first seal 64, the second seal 76 helps to protect the electrical contact between the spacer 66 and the ground plane 44. Specifically, the second seal 76 discourages moisture and debris from entering the space around the spacer 66 and, thereby, protects the electrical connection 74 between the spacer 66 and the ground plane 44.

Figure 7:
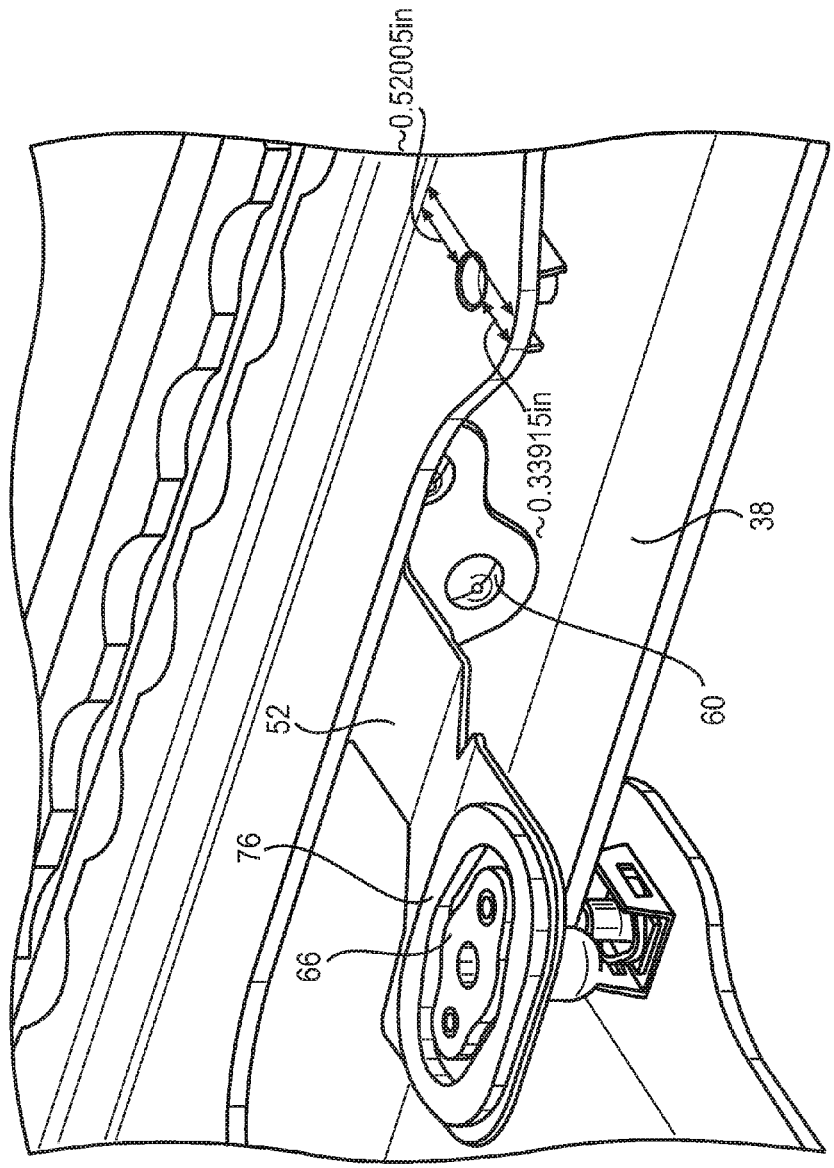
FIG. 7 is a perspective, top view of one of the brackets illustrated in FIG. 6, with the floor panel having been removed for clarity.

FIG. 7 is a perspective illustration of the bracket 52 illustrated in FIGS. 5 and 6. The perspective is taken from above the bracket 52 with the floor panel 30 having been removed.

Figure 8:
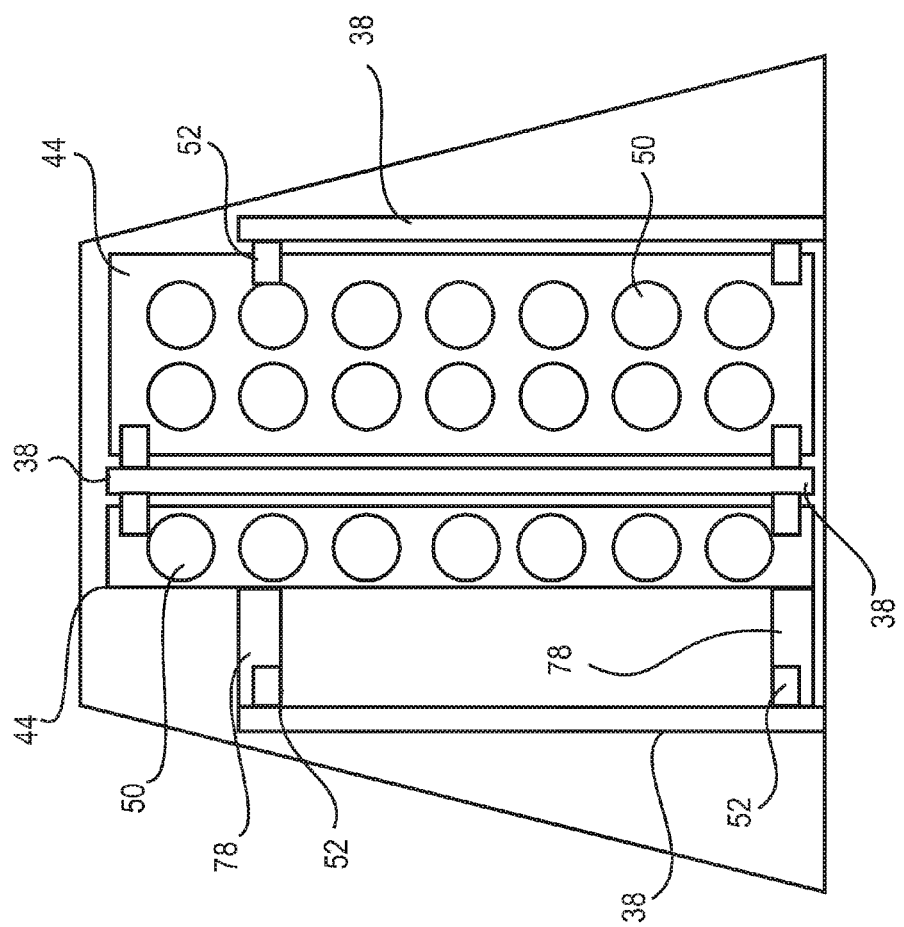
FIG. 8 is a graphical top view, showing two implementations of the ground panel and brackets of the present invention.

FIG. 8 is a graphical top view of two contemplated installations of the ground plane 44 according to the present invention.

On the right hand side of FIG. 8, the ground plane 44 extends nearly the full distance between adjacent joists 38. On the left hand side, the ground plane 44 extends partially between two adjacent joists 38.

It is noted that the embodiment provided on the left hand side of FIG. 8 includes extensions 78 that extend outwardly from the ground plane 44 to the edge of the floor plate 30 on which the ground plate 44 is disposed. The brackets 52 connect to the extensions 78 in the same manner as the brackets 52 connect to the ground plane 44. Specifically, the brackets 52 connect to the extensions 78 via one or more fasteners 56.

In another contemplated embodiment, it is contemplated that the extensions 78 may be substituted by elongated brackets (not shown) that extend from the joists 38 (and/or cross-joists 48) to the ground plate 44. The elongated brackets (no shown) are, therefore, considered to fall within the scope of the present invention.

In both embodiments, it is contemplated that four brackets 52 will connect between the joists 38 and the ground planes 44 at roughly the corners of the ground planes 44. This arrangement is preferred because the arrangement provides acceptable redundancy. Moreover, by connecting the brackets at the corners of the ground planes 44, a better distribution of electrical protection is established. As should be apparent, however, a larger or a smaller number of brackets 52 may be employed without departing from the scope of the present invention.

As should be apparent from the foregoing, the present invention is contemplated to be disposed in an aircraft 10. The aircraft 10 may be made entirely with a metal skin, with a partially metal skin with nonmetal portions, or entirely from a non-metallic material such as carbon fiber composite.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A bracket for connecting a ground plane to a joist for shielding of at least one component within an aircraft, comprising:
    a body defining a first end and a second end, wherein the first end connects to a ground plane and wherein the second end connects to the joist;
    at least one first fastener connecting the first end to the ground plane;
    at least one second fastener connecting the second end to the joist;
    a spacer connected to the first end, establishing a contact surface between the spacer and the ground plane; and
    a seal surrounding the spacer.

2. The bracket of claim 1, wherein the spacer comprises: an electrically conductive material.

3. The bracket of claim 1, wherein the bracket comprises metal.

4. The bracket of claim 1, wherein the spacer comprises:
    a peripheral portion; and
    an inner portion with a thickness greater than that of the peripheral portion.

5. The bracket of claim 1, wherein the seal comprises an elastomeric material.

6. The bracket of claim 1, wherein the ground plane shields the at least one component from at least one of electromagnetic and radio frequency interference.

* * * * *